3,147,195
PROCESS FOR THE MICROBIOLOGICAL OXIDATION OF STEROIDS USING *MUCOR GRISEOCYANUS*
Jakob Urech and Ernst Vischer, Basel, and Albert Wettstein, Riehen, Switzerland, assignors to Ciba Corporation, New York, N.Y., a corporation of Delaware
No Drawing. Filed May 3, 1962, Ser. No. 192,047
Claims priority, application, Switzerland, June 6, 1961, 6,638/61
4 Claims. (Cl. 195—51)

The present invention provides a process for the microbiological hydroxylation of steroids of the pregnane series with enzymes of moulds of the species *Mucor griseocyanus*.

It is already known that *Mucor griseocyanus* hydroxylates desoxycorticosterone and progesterone mainly in position 14; in addition to the 14-hydroxysteroid small amounts of 8-hydroxy and 9-hydroxy derivatives are formed. With other corticosteroids oxidation takes place also in position 6. In this manner there are formed, for example, in the incubation of Reichstein's substance S considerable amounts of 14-hydroxy and of 6-hydroxy derivatives and traces of hydrocortisone are likewise detectable. Surprisingly, it has now been observed that in the presence of a 16-alkyl group such, for example, as a methyl group, the oxidation leads predominantly to the formation of the 11β-hydroxyl group, while 14-hydroxylation is completely absent.

Thus, the present process is distinguished by the use of enzymes of moulds of the species *Mucor griseocyanus* for the microbiological 11β-hydroxylation of 11-unsubstituted Δ$^4$-3:20-dioxo-16α-alkylpregnenes or functional derivatives thereof.

The starting materials may also contain further substituents and/or double bonds. As particularly suitable substituents there may be mentioned: Free or functionally converted hydroxyl, oxo or carboxyl groups, more especially hydroxyl groups in position 17 or 21; furthermore halogen atoms such as fluorine or chlorine, above all in position 6. Functionally converted hydroxyl groups are, above all, etherified or esterified hydroxyl groups, for example hydroxyl groups esterified with a lower aliphatic carboxylic acid, a monocyclic aromatic or heterocyclic carboxylic acid and a lower monocyclic araliphatic carboxylic acid or hydroxyl groups etherified with a lower alkanol or with a pyranol, such as tetrahydropyranol. Functionally converted oxo compounds are, more especially, ketals, e.g. derived from lower aliphatic divalent alcohols, enol derivatives such as enolethers, enolesters and enamines; furthermore nitrogeneous derivatives such as hydrazones, oximes and semicarbazones. Oxo or acid groups may be present preferably in position 18. Finally there may also be present further hydrocarbon residues, such as alkyl, more especially methyl groups, for example in position 1, 2 or 6. From among the poly-unsaturated compounds to be used as starting materials the 1-dehydro derivatives may be mentioned particularly.

The afore-mentioned starting materials are incubated according to the present process in known manner with cultures of the moulds referred to above under as such known aerobic conditions. The cultivation is carried out in a surface culture or, industrially with greater advantage, submersed with shaking or stirring. The cultures contain assimilable carbon, more especially carbohydrates, and possibly also growth-promoting substances, for example corn steep liquor or beer wort and inorganic salts. Thus, the nutrient solution used may be natural, synthetic or semi-synthetic. The process which is simplest to perform on an industrial scale is described below without intending thereby any limitation of the scope of the invention:

The organism is cultivated in an apparatus and under conditions similar to those employed in the manufacture of antibiotics as the so-called deep-tank method. After development of the culture the aforementioned starting materials are added in the form of a fine dispersion or solution, for example in methanol, acetone or ethylene glycol, and incubation is then continued. Finally, the mycelium is isolated, the filtrate and/or the mycelial mass is/are extracted and the 11-hydroxy compound is isolated from the extract in known manner, for example by way of a demixing operation, adsorption, chromatography, crystallization, conversion into a functional derivative such as an ester, or the like. These reactions may also be performed thus: The active enzymes are first isolated from suitable aerobic cultures of the aforementioned organisms and then used after having removed the growing culture. Thus for example, the mycelium formed by suitable aerobic cultures of said organisms is separated, suspended in water or a buffer solution, the said starting material is added to this suspension and the mixture is then incubated.

By the present process it is possible to prepare from 11-unsubstituted Δ$^4$-3:20-diketo-16α-alkylpregnenes or from functional derivatives thereof—such, for example, as the corresponding monoketals or diketals—the known, therapeutically active 11β-hydroxypregnenes such, for example, as corticosteroids and substitution products thereof. Of special value are, for example, compounds of the formula

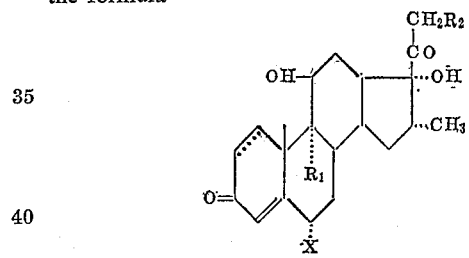

where X represents a chlorine or fluorine atom, $R_1$ a hydrogen or a halogen atom, and $R_2$ a free or functionally converted hydroxyl group. Thus, for example, Δ$^4$-3:20-dioxo-6α-fluoro-17α:21-dihydroxy-16α-methylpregnene on incubation according to the invention with a culture of *Mucor griseocyanus* gives a very good yield of 6α-fluoro-16α-methylhydrocortisone which displays a high glucocorticoid action.

The starting materials are known or can be prepared by known methods.

*Example*

Six conical flasks of 500 cc. capacity are each charged with 100 cc. of a nutrient solution which contains per liter 20 grams of peptone, 50 grams of crude glucose and 5 cc. of corn steep liquor and has been adjusted to pH=6.2. The solutions are sterilized for 30 minutes under a pressure of 1.1 atmospheres (gauge), allowed to cool to room temperature and then inoculated with a spore suspension of *Mucor griseocyanus*. After 44 hours each of the six cultures is treated with 1 cc. of a 3% solution of Δ$^4$-3:20-dioxo-6α-fluoro-16α-methyl-17α:21-dihydroxypregnene (total: 180 mg.) and shaken for 67 hours at 26–28° C.

The cultures are collected, suctioned through a nylon filter, the mycelium is repeatedly and thoroughly triturated with ethyl acetate and expressed, the culture filtrate is saturated with sodium chloride and then extracted successively with 180, 150 and 120 cc. of ethyl acetate. The extracts are washed with 30 cc. of 2% sodium bicarbonate solution and then 3 times with 30 cc. of water until the washings run neutral. The ethyl acetate solutions are dried with sodium sulfate, evaporated under vacuum at a bath temperature of 50° C., to leave as the residue 349 mg. of a substantially oily substance which is chromatographed on 5.4 grams of inactivated silica gel (Davison No. 922, inactivated with 15% by weight of water). Elution with methylene chloride+acetone 95:5 furnishes only starting material, whereupon 122 mg. of crude $\Delta^4$-3:20-dioxo-6α-fluoro-16α - methyl - 11β:17α:21-trihydroxypregnene are eluted with a 9:1-mixture of methylene chloride and acetone. After having been recrystallized from acetone+ether it melts at 212–214° C. Optical rotation $[\alpha]_D^{25} = +105°$ (c.=0.31 in dioxane).

What is claimed is:

1. Process for the microbiological 11β-hydroxylation of a member selected from the group consisting of 11-unsubstituted $\Delta^4$-3,20 - dioxo - 16α - alkyl - pregnene-compounds and their functional derivatives in which hydroxyl groups are in the form of a member selected from the group consisting of esterified hydroxyl groups and etherified hydroxyl groups, and oxo groups are in the form of a member selected from the group consisting of ketalized oxo groups, hydrazones, oximes and semicarbazones, wherein there are used enzymes from fungi of the species *Mucor griseocyanus*.

2. Process as claimed in claim 1, wherein there is used as starting steroid the $\Delta^4$-6α-fluoro-3,20-dioxo-17α,21-dihydroxy-16α-methyl-pregnene.

3. Process as claimed in claim 1, wherein the starting steroids are incubated under aerobic conditions with a growing culture of fungi of the species *Mucor griseocyanus*.

4. Process as claimed in claim 1, wherein there is used as starting material a member selected from the group consisting of a compound having the formula

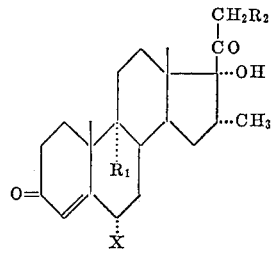

in which formula X represents a member selected from the group consisting of chlorine and fluorine, $R_1$ is a member selected from the group consisting of hydrogen and halogen, and $R_2$ a member selected from the group consisting of a free hydroxyl group and an esterified hydroxyl group, and a 1-dehydro derivative thereof.

References Cited in the file of this patent
UNITED STATES PATENTS

| | | |
|---|---|---|
| 2,922,798 | Wettstein et al. | Jan. 26, 1960 |
| 2,992,972 | Murray et al. | July 18, 1961 |